(12) United States Patent
Söllinger et al.

(10) Patent No.: US 11,666,982 B2
(45) Date of Patent: Jun. 6, 2023

(54) METHOD AND DEVICE FOR PROVIDING A REFERENCED DISTANCE SIGNAL FOR CONTROLLING THE POSITION OF A WELDING TORCH

(71) Applicant: Fronius International GmbH, Pettenbach (AT)

(72) Inventors: Dominik Söllinger, Pettenbach (AT); Andreas Hummelbrunner, Pettenbach (AT); Wilhelm Ortbauer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 492 days.

(21) Appl. No.: 16/642,148

(22) PCT Filed: Aug. 31, 2018

(86) PCT No.: PCT/EP2018/073493
§ 371 (c)(1),
(2) Date: Feb. 26, 2020

(87) PCT Pub. No.: WO2019/043168
PCT Pub. Date: Mar. 7, 2019

(65) Prior Publication Data
US 2020/0306862 A1 Oct. 1, 2020

(30) Foreign Application Priority Data
Sep. 1, 2017 (EP) ..................................... 17189020

(51) Int. Cl.
*B23K 9/095* (2006.01)
*B23K 9/12* (2006.01)
(Continued)

(52) U.S. Cl.
CPC .......... *B23K 9/0953* (2013.01); *B23K 9/0956* (2013.01); *B23K 9/126* (2013.01); *B23K 37/0258* (2013.01); *B25J 13/087* (2013.01)

(58) Field of Classification Search
CPC ...... B23K 9/124; B23K 9/1062; B23K 9/044; B23K 9/095; B23K 9/0953; B23K 9/0956; B23K 9/126; B23K 37/0258
See application file for complete search history.

(56) References Cited

U.S. PATENT DOCUMENTS

| 5,780,808 A | 7/1998 | Moon |
| 6,000,598 A | 12/1999 | Moon |

(Continued)

FOREIGN PATENT DOCUMENTS

| CN | 1469791 A | 1/2004 |
| CN | 101296773 A | 10/2008 |

(Continued)

OTHER PUBLICATIONS

International Search Report corresponding to international application No. PCT/EP2018/073493 dated Nov. 30, 2018, (2 pages).

*Primary Examiner* — Brian W Jennison
(74) *Attorney, Agent, or Firm* — Maginot, Moore & Beck LLP

(57) ABSTRACT

A method for providing a referenced distance signal which corresponds to the distance between a contact tip of a welding torch and a workpiece to be machined, includes adjusting an operating point on a predetermined welding characteristic, which is defined at least by a wire feed rate, a welding voltage and/or a welding current, and a CTWD distance between the contact tip and the workpiece; determining a target parameter value of at least one parameter dependent on the CTWD distance for the operating point; determining an actual parameter value of the at least one parameter by measuring at least one of the present wire feed (Continued)

rate, welding voltage and/or welding current; modifying the determined actual parameter value as a function of a calculated difference between the target parameter value and a predetermined reference value; and outputting the referenced distance signal corresponding to the modified actual parameter value to a position control system of a robot arm.

8 Claims, 6 Drawing Sheets

(51) Int. Cl.
*B23K 37/02* (2006.01)
*B25J 13/08* (2006.01)

(56) References Cited

U.S. PATENT DOCUMENTS

| | | |
|---|---|---|
| 2007/0170164 A1 | 7/2007 | Nadzam |
| 2011/0198331 A1* | 8/2011 | Shigeyoshi ............ B23K 9/126 219/130.32 |
| 2014/0001166 A1 | 1/2014 | Peters et al. |
| 2014/0312020 A1* | 10/2014 | Daniel ................... B23K 9/126 219/124.02 |
| 2015/0108096 A1* | 4/2015 | Daniel ................ B23K 9/0956 219/76.12 |
| 2015/0375331 A1* | 12/2015 | Hutchison ................ B23K 9/09 219/136 |
| 2016/0125592 A1 | 5/2016 | Becker et al. |

FOREIGN PATENT DOCUMENTS

| | | |
|---|---|---|
| CN | 103737163 A | 4/2014 |
| CN | 105263661 A | 1/2016 |
| DE | 202014010776 U1 | 8/2016 |
| EP | 1268110 A1 | 1/2003 |
| EP | 3160675 A1 | 5/2017 |
| JP | 3206212 U | 9/2016 |
| WO | 0176799 A1 | 10/2001 |

* cited by examiner

METHOD AND DEVICE FOR PROVIDING A REFERENCED DISTANCE SIGNAL FOR CONTROLLING THE POSITION OF A WELDING TORCH

This application is a 35 U.S.C. 371 National Stage application of PCT/EP2018/073493, filed Aug. 31, 2018, and claims priority to European Application No. EP 17189020.5 filed on Sep. 1, 2017. The entire contents of the above-mentioned patent applications are incorporated herein by reference as part of the disclosure of this U.S. application.

The invention relates to a method and a device for providing a referenced distance signal for controlling the position of a welding torch relative to a workpiece to be machined.

A conventional arc welding device has a welding torch or welding head, the position of which is regulated or tracked so as to produce a weld seam on a workpiece to be machined. The welding torch is supplied with a welding wire electrode, the tip of which protrudes out of the welding torch, an arc occurring between the tip of the welding wire electrode and the workpiece to be machined during the welding process. During the welding process, the welding wire electrode is supplied continuously at a wire feed rate by a wire feed device, the welding wire electrode melting away at the tip thereof during the welding process.

FIG. 1 schematically shows an example of a conventional welding torch SB comprising a contact pipe KR enclosed by an insulating guide IF. Between the contact pipe or contact tip KS of the welding torch SB and the workpiece W to be machined, there is a CTWD distance (contact-tip-to-work distance). At the lower end of the welding torch SB, a stick-out length of the welding wire electrode SDE visibly protrudes out of the insulating casing. The distance between the lower edge of the welding torch SB and the workpiece W to be machined forms a visible CTWD distance CTWD'. In FIG. 1, the stick-out length SOL of the welding wire electrode SDE and an arc length LBL of an arc LB between the tip of the protruding welding wire electrode SDE and the workpiece W to be machined can be seen. The visible CTWD distance CTWD' comprises the stick-out length SOL and the arc length LBL of the arc, as can be seen in FIG. 1.

The welding torch SB is conventionally fixed to a robot arm, the position of which relative to the workpiece W is controlled or regulated by a seam track control signal. In conventional welding devices, the seam track signal is referenced in that a reference journey is initially performed using set welding parameters. During this reference journey, the signal level is measured and set as a target value for the height regulation of the robot arm. A drawback of the conventional procedure is that if the welding characteristic is changed the reference journey for referencing the seam track signal has to be carried out anew. Moreover, errors may occur in the conventional procedure, for example because the workpiece is clamped incorrectly.

Therefore, an object of the present invention is to provide a method and device for providing a reference distance signal which can be used as a seam track signal and which does not require a further reference journey of the welding torch even in the event of a change in a welding characteristic or of other corrections.

This object is achieved according to the invention by a method having the features set out in claim 1.

In a first aspect, the invention provides a method for providing a reference distance signal which corresponds to the distance between a contact tip of a welding torch and a workpiece to be machined, comprising the steps of:

adjusting an operating point on a predetermined welding characteristic, which is defined at least by a wire feed rate, a welding voltage and a welding current, and a CTWD distance between a contact tip of the welding torch and the workpiece to be machined, reading out or determining a target parameter value of at least one parameter dependent on the CTWD distance for the operating point set on the welding characteristic, determining an actual parameter value of the parameter dependent on the CTWD distance by measuring at least one of the present welding parameters of wire feed rate, welding voltage or welding current, modifying the determined actual parameter value as a function of a difference between the target parameter value and a reference value, and outputting the referenced distance signal corresponding to the modified actual parameter value.

In one possible embodiment of the method according to the invention, the parameter dependent on the CTWD distance includes the welding voltage, the welding current and/or the wire feed rate of the welding wire electrode.

In a further possible embodiment of the method according to the invention, the parameter dependent on the CTWD distance is a variable derived from the welding voltage, the welding current and/or the wire feed rate.

In one possible embodiment of the method according to the invention, the parameter dependent on the CTWD distance is a resistance, which represents a variable derived from the welding voltage and the welding current.

In a further possible embodiment of the method according to the invention, the parameter dependent on the CTWD distance is the electrical power, which represents a variable derived from the welding voltage and the welding current.

In a further possible embodiment of the method according to the invention, the referenced distance signal is outputted as a seam track signal to a control unit for regulating a position of the welding torch during a welding process.

In one possible embodiment of the method according to the invention, the determined actual parameter value is modified by adding the difference between the target parameter value and a reference value onto the determined actual parameter value, as an offset.

In a further possible alternative embodiment of the method according to the invention, the determined actual parameter value is modified by multiplying it by a correcting factor, which is determined as a function of the difference between the target parameter value and the reference value.

In a further possible embodiment of the method according to the invention, the welding voltage and the welding current are measured using sensors, which are provided on the welding torch and/or on a welding power source connected to the welding torch.

In a further aspect, the invention further provides a device for providing a reference distance signal having the features set out in claim 8.

The invention accordingly provides a device for providing a reference distance signal, which corresponds to the distance between a contact tip of a welding torch and a workpiece to be machined, comprising:

an adjustment unit for adjusting an operating point on a predetermined welding characteristic, which is defined at least by a wire feed rate, a welding voltage and a welding current, and for adjusting a CTWD distance between a contact tip of the welding torch and the workpiece to be machined, a target value determination unit for determining a target parameter value of at least one parameter dependent on the CTWD distance for the operating point set on the welding characteristic, an actual value determination unit for determining an actual parameter value of the parameter dependent on the CTWD distance by measuring at least the wire feed rate, the welding voltage and/or the welding current, a modification unit for automatically modifying the determined actual parameter value as a function of a calculated difference between the determined target parameter value and a predetermined reference value, and an output unit for outputting a referenced distance signal corresponding to the actual parameter value modified by the modification unit.

In one possible embodiment of the device according to the invention, the output unit has an interface for transmitting the referenced distance signal, as a seam track signal, to a control unit which controls a position of the welding torch as a function of the seam track signal during the welding process.

In a further possible embodiment of the device according to the invention, the modification unit modifies the determined actual parameter value by adding a calculated difference between the target parameter value determined by the target value determination unit and a reference value onto the actual parameter value determined by the actual value determination unit, as an offset value.

In a further possible alternative embodiment of the device according to the invention, the modification unit modifies the determined actual parameter value by multiplying the actual parameter value by a correcting factor, which is determined as a function of the difference between the target parameter value determined by the target value determination unit and the reference value.

In a further possible embodiment of the device according to the invention, the actual value determination unit has sensors which detect in a sensory manner the actual parameter values of parameters which are dependent on the CTWD distance.

In a further possible embodiment of the device according to the invention, the sensors are provided on the welding torch itself or on a welding power source connected to the welding torch.

In a further aspect, the invention further provides a welding torch having the features set out in claim 14.

The invention accordingly provides a welding device comprising a control unit which controls a position of the welding torch during the welding process as a function of a referenced distance signal, the distance signal being provided by a device in accordance with the second aspect of the invention.

In one possible embodiment of the welding device, the welding torch is moved by a robot arm, the position of which relative to the workpiece to be machined is automatically regulated by the control unit of the welding device as a function of the referenced distance signal.

In the following, possible embodiments of the method according to the invention and device according to the invention for providing a referenced distance signal are described in greater detail with reference to the accompanying drawings, in which.

Figure 1:
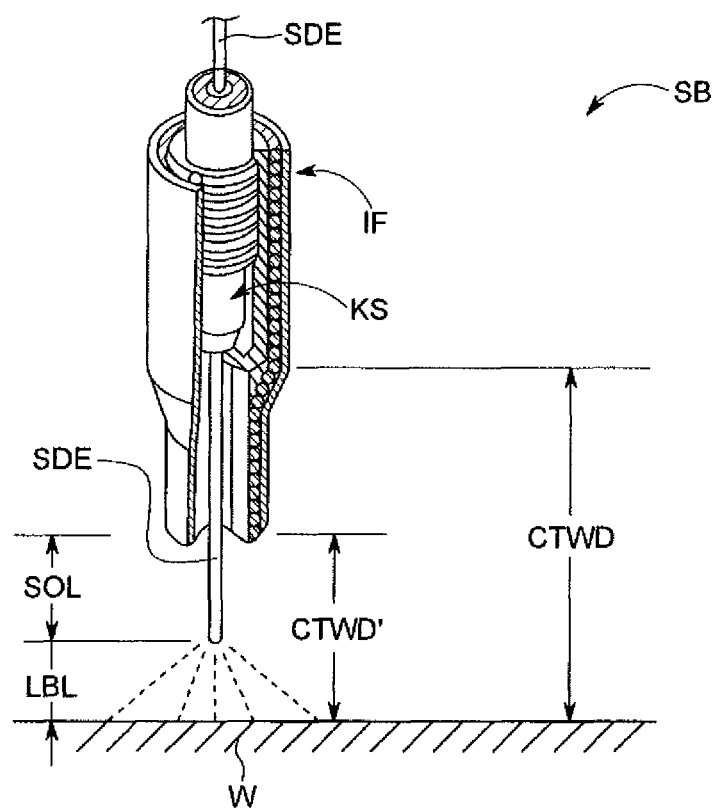
FIG. 1 is a schematic drawing of a welding torch having a CTWD distance from a workpiece to be machined.
Figure 2:
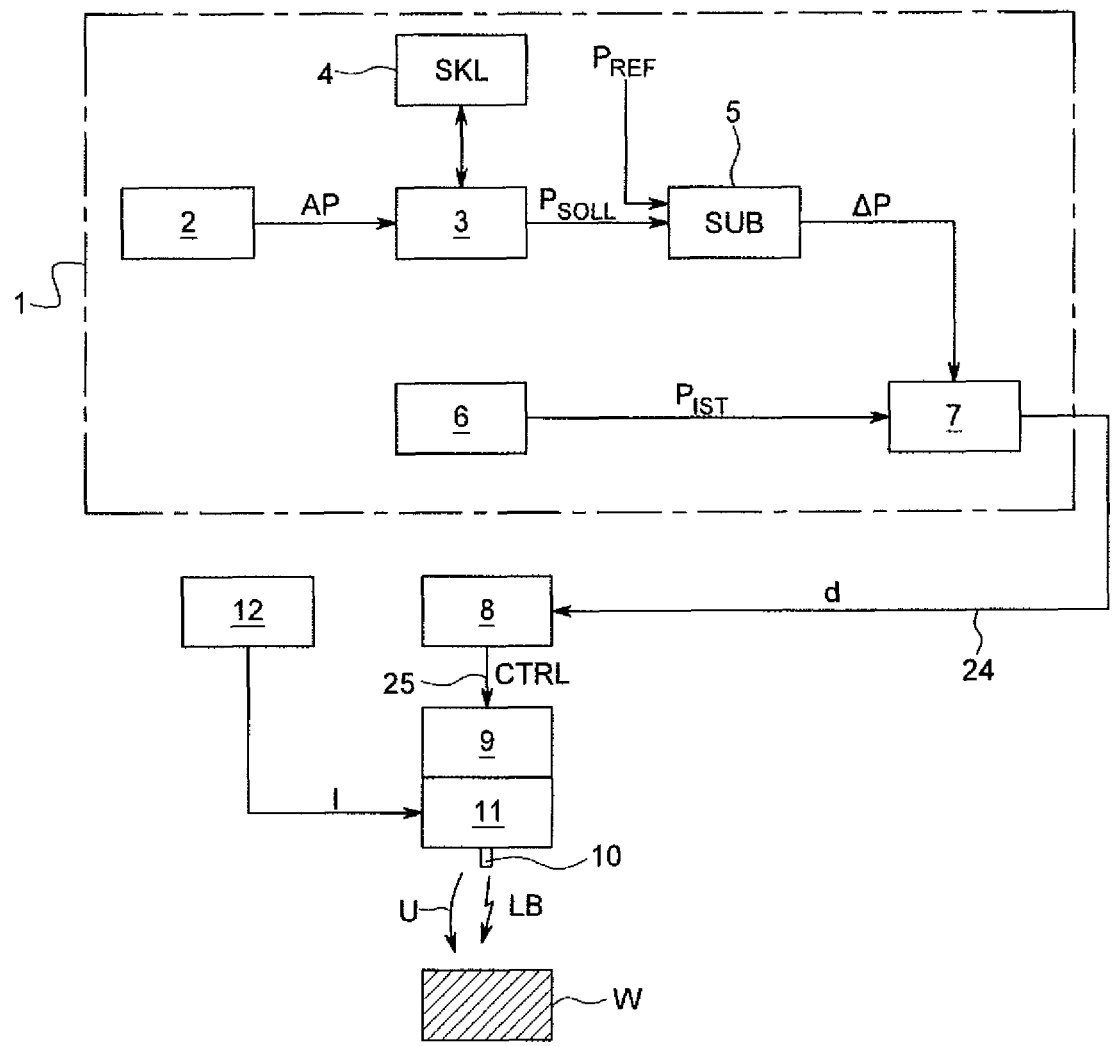
FIG. 2 is a block diagram illustrating a possible example embodiment of a device according to the invention for providing a referenced distance signal in a welding device.

As can be seen from FIG. 2, in the embodiment shown, a device 1 according to the invention for providing a referenced distance signal d has a plurality of components or units. In the embodiment shown, the device 1 comprises an adjustment unit 2, which serves to adjust an operating point AP on a stored welding characteristic SKL. The stored welding characteristic SKL is defined at least by a wire feed rate $V_D$ of a welding wire electrode SDE, by a welding voltage U and by a welding current I. The adjustment unit 2 of the device 1 further serves to adjust a CTWD distance between a contact tip of the welding torch 11 and the workpiece W to be machined.

The device 1 further comprises a target value determination unit 3. The target value determination unit 3 determines a target parameter value $P_{Soll}$ of at least one parameter P, dependent on the set CTWD distance, for the operating point AP set on the welding characteristic SKL. The welding characteristics SKL are preferably saved in a memory unit 4 to which the target value determination unit 3 has access. The parameter P dependent on the CTWD distance may for example be a welding resistance R. Further, the welding parameter P dependent on the CTWD distance may be the welding voltage U, the welding current or the wire feed rate $V_D$ or another variable derived therefrom, such as the electrical welding power. The welding characteristic SKL has been created for a particular CTWD distance, and is preferably saved in a welding characteristic memory 4. The user can also adjust this CTWD value using the adjustment unit 2. The user can set a CTWD value, but in this case the reference values will be recalculated or the customer regulates to a value which is known to him (calibration journey using new CTWD distance).

A subtraction unit 5 (SUB) calculates a difference between the target parameter value $P_{Soll}$ and a reference value of the parameter $P_{ref}$ as is shown in FIG. 2.

The device 1 further includes an actual value determination unit 6 for determining an actual parameter value $P_{Ist}$ of the relevant parameter P which is dependent on the CTWD distance. This is preferably done by measuring at least one of the present welding parameters, specifically the wire feed rate $V_D$, the welding voltage U or the welding current I. The determined current parameter value $P_{Ist}$ is supplied to a modification unit 7 of the device 1, as is shown in FIG. 2. The modification unit 7 adjusts the determined actual parameter value $P_{Ist}$ as a function of the calculated parameter difference $\Delta P$ between the determined target parameter value $P_{Soll}$ and the predetermined reference value $P_{ref}$. In one possible implementation, the modification unit 7 modifies the determined actual parameter value $P_{Ist}$ by adding a calculated difference $\Delta P$ between the target parameter value $P_{Soll}$ determined by the target value determination unit 3 and the reference value $P_{ref}$ onto the actual parameter value $P_{Ist}$ determined by the actual value determination unit 6, as an offset. In one possible embodiment, the parameter P in question is a welding resistance R. The welding resistance R is a variable which is dependent on the welding voltage U and the welding current I (R=U/I). Thus, in this embodiment, the determined actual value of the resistance $R_{Ist}$ is modified by adding the difference ΔR between the target resistance and a reference resistance onto the determined actual resistance $R_{Ist}$, as an offset.

In an alternative embodiment of the device 1 according to the invention, the modification unit 7 modifies the determined actual parameter value $P_{Ist}$ by multiplying the actual parameter value $P_{Ist}$ by a correcting factor KF. This correcting factor KF is preferably determined as a function of a calculated difference ΔP between the target parameter value $P_{Soll}$ determined by the target value determination unit 3 and a reference value $P_{ref}$. In one possible embodiment, the parameter in question is the welding resistance R. In this embodiment, the determined actual resistance $R_{Ist}$ or instantaneously measured resistance R, which results from the welding voltage U and the welding current I is modified by multiplying it by a correcting factor KF, which is determined as a function of the difference ΔR between the target resistance value $R_{Soll}$ and the reference resistance value $R_{ref}$.

The device 1 has an output unit for outputting the referenced distance signal d, which corresponds to the actual parameter value $P_{Ist}$ modified by the modification unit 7, as is shown in FIG. 2. In one possible embodiment, the actual value determination unit 6 of the device 1 has sensors which detect in a sensory manner the actual parameter values $P_{Ist}$ of parameters P which are dependent on the CTWD distance. In one possible embodiment, these parameters P are the welding voltage U, the welding current I and/or the wire feed rate VD for the welding wire electrode 10. In one possible embodiment, the sensors of the actual value determination unit 6 are provided on the welding torch of the welding device and/or on a welding power source 12, connected to the welding torch 11, of the welding device.

In one possible embodiment, the device 1 transmits the referenced distance signal d to a robot control unit 8. In one possible embodiment, the robot control device 8 controls the position of a robot arm 9, which holds or carries the welding torch 11 of the welding device SG. The welding torch 11 is connected to a welding power source 12, which supplies it with a welding current I. As is schematically shown in FIG. 2, the supplied welding wire electrode 10 protrudes out of the welding torch 11, an arc LB being formed between the welding wire electrode 10 and the workpiece W to be machined during the welding process.

Figure 3:
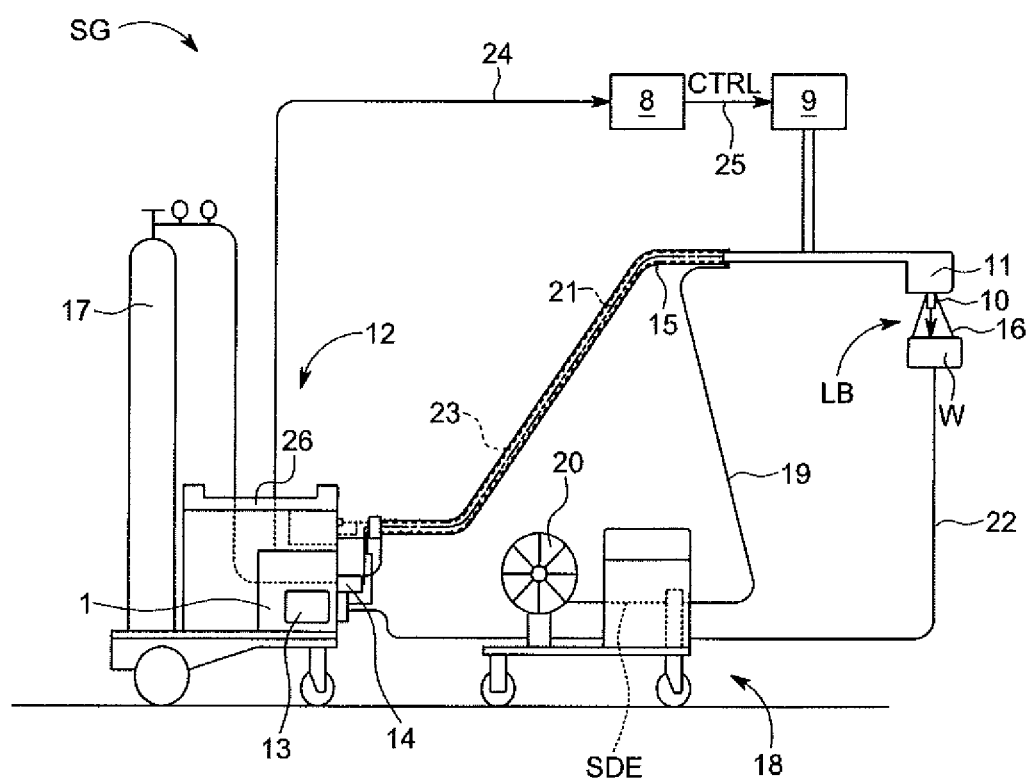
FIG. 3 is a diagram illustrating an example embodiment of a welding device according to the invention, which includes the device according to the invention for providing a referenced distance signal.

FIG. 3 shows an embodiment of a welding device SG which may include a device 1 for providing a referenced distance signal d. FIG. 3 schematically shows a welding system or welding device SG, which is suitable for carrying out various welding methods, in particular MIG/MAG arc welding. The welding device SG has a welding power source 12 comprising a power unit 13. In one possible embodiment, a control unit of the welding power source 12 can actuate a control valve 14, which is arranged in a supply line 15 for a protective gas 16. The protective gas 16 may for example be carbon dioxide, helium or argon, which is stored in a protective gas store 17 of the welding device SG. A control unit of the welding power source 12 further actuates a wire feed device 18. Via a wire guide line 19, a welding wire or a welding wire electrode 10 is supplied from a supply drum 20.

An electric current I for establishing an arc LB between the welding wire electrode 10 and the workpiece W can be supplied to the welding torch 11 or the welding wire 10 guided therein via a welding line 21 of the power unit of the welding power source 12. The workpiece W to be welded or machined can also be connected, via a further welding line 22, to the welding device SG, in particular to the welding power source 12 thereof, in such a way that a power circuit can be closed via the arc LB. For cooling the welding torch 11, a cooling circuit 23 may further be provided.

In the embodiment shown in FIG. 3, the device 1 is located within a housing of a welding power source 12 of a welding device SG, and delivers the referenced distance signal or seam track signal d to a robot control unit 8 via a line 24. The robot control unit 8 controls a position or vertical position of a robot arm 9, which carries or holds the welding torch 11, as a function of the seam track signal d by means of a control signal CTRL via the control line 25.

In one possible embodiment, the device 1 according to the invention for providing a referenced distance signal d is located in the housing of the welding power source 12, as is indicated in FIG. 3. The provided referenced distance signal d corresponds to the distance between a contact tip of the welding torch 11 and the workpiece W to be machined. The robot control unit 8 controls the robot arm 9 via the control line 25 as a function of the seam track signal, which is received via the line 24 and corresponds to the referenced distance signal d. The robot arm 9 is mechanically coupled to the welding torch 11, as is shown in FIG. 3.

The welding power source 12 has a user interface. In one possible embodiment, the adjustment unit 2 of the device 1 according to the invention is integrated into a user interface 26 of the welding power source 12. Via the user interface 26, a user or welder has the option to adjust an operating point AP on a stored welding characteristic SKL. The operating point AP may be selected by way of various parameters P, in particular the wire feed rate $V_D$ of the welding wire electrode 10, a welding voltage U between the tip of the welding wire electrode SDE and the workpiece W to be processed, and a welding current I supplied to the welding torch 11. Further possible parameters P for selecting the operating point AP include a material thickness, a welding power, a seam shape of the weld seam, a design throat thickness, a heat input, a welding rate etc.

Figure 4:
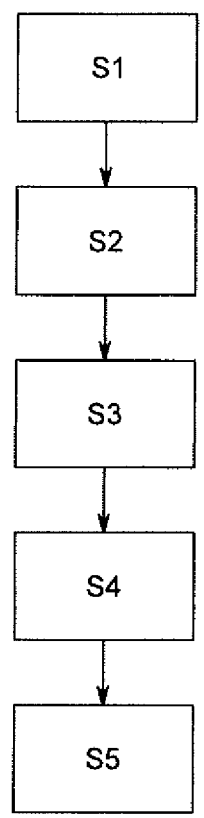
FIG. 4 is a flow chart illustrating an embodiment of a method according to the invention for providing a referenced distance signal.

FIG. 4 is a flow chart of an embodiment of a method according to the invention for providing a referenced distance signal d.

In a first step S1, an operating point AP on a predetermined welding characteristic SKL is adjusted. This is done for example by a welder or user by way of a user interface 26 of the welding power source 12. The welding characteristics SKL are preferably saved in an internal memory 4 of the device 1.

Figure 5:
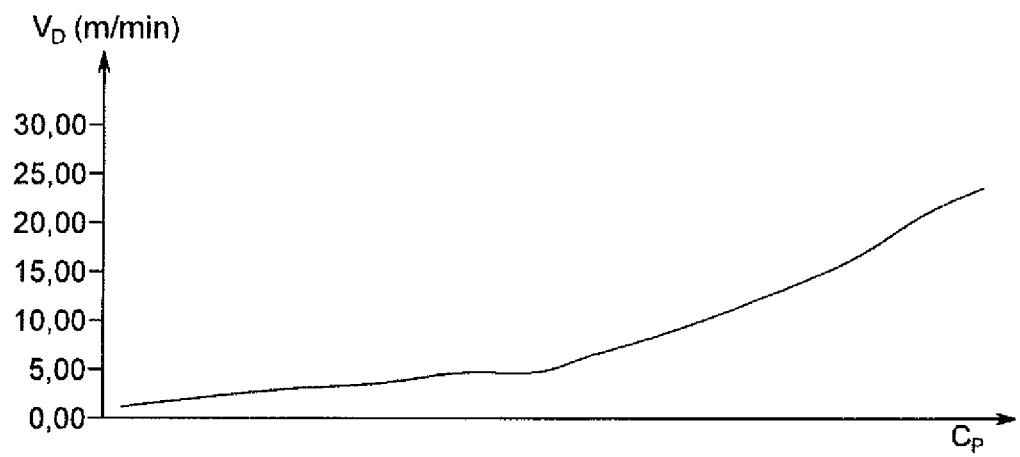
FIGS. 5 to 8 show examples of welding characteristics which can be used in a welding device according to the invention.

FIG. 5, 6, 7, 8 show various welding characteristics SKL such as may be stored in a memory 4 of the device 1.

FIG. 5 shows a wire feed rate $V_D$ in metres per minute for various characteristic points CP.

Figure 6:
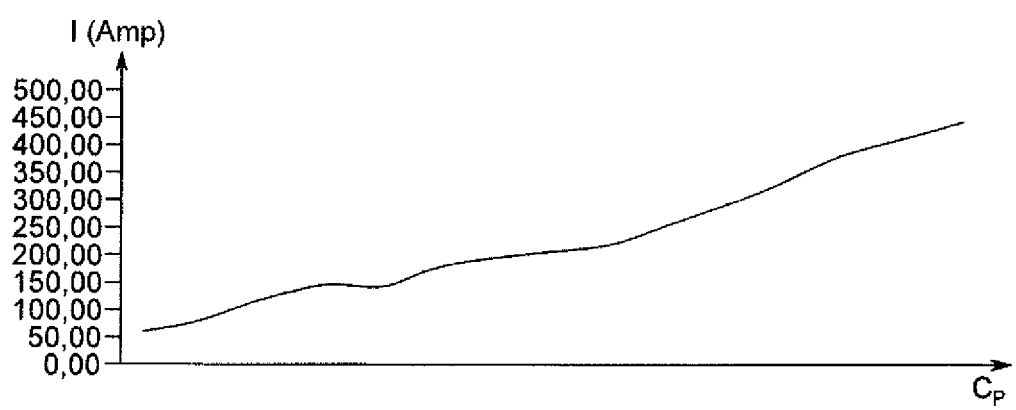

FIG. 6 shows a welding current I in amps for various characteristic points CP.

Figure 7:
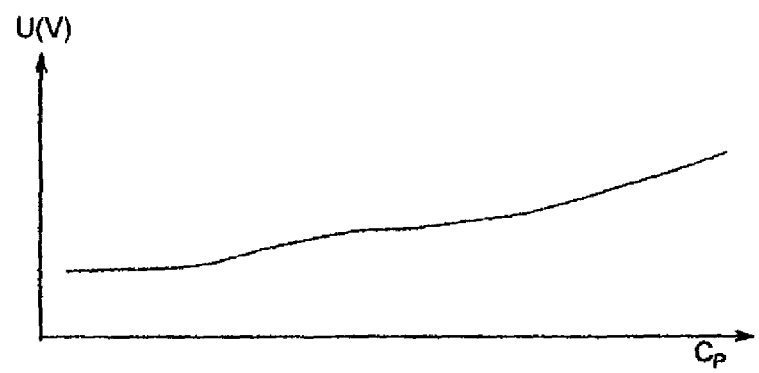

FIG. 7 shows a welding voltage U in volts for various characteristic points CP.

Figure 8:
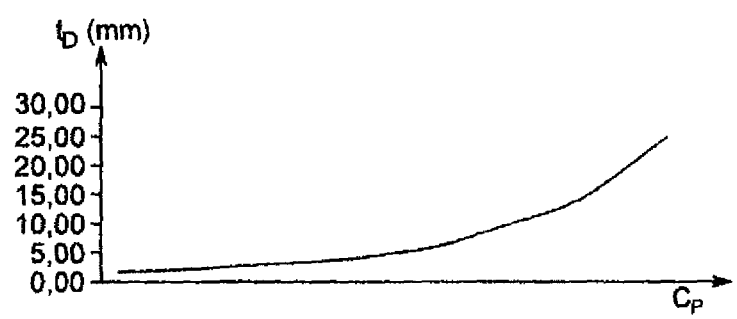

FIG. 8 shows a material thickness in millimetres for various characteristic points CP.

In a further step S2, a target parameter value $P_{Soll}$ for at least one parameter P, dependent on the CTWD distance, for the operating point set on the welding characteristic SKL is read out or determined. In one possible embodiment, this is done by means of the welding characteristic SKL, such as is shown for example in FIGS. 5 to 8, which is saved in the data memory 4.

In a further step S3, a current parameter value $P_{Ist}$ of the parameter P dependent on the CTWD distance is determined by measuring at least one of the present welding parameters. These welding parameters include in particular the wire feed rate $V_D$ of the welding wire electrode SDE, the set or present welding voltage U, and the presently flowing welding current I. In one possible embodiment, some or all of the welding parameters P are detected using sensors so as to determine the actual parameter value $P_{Ist}$ of the parameter P in question.

In a further step S4, the determined actual parameter value $P_{Ist}$ is automatically modified or continuously adapted as a function of a different between the target parameter value $P_{Soll}$ and a reference value.

In a further step S5, the referenced distance signal d, which corresponds to the actual value $P_{Ist}'$, modified in step S4, of the parameter, is outputted. In this context, in one possible embodiment the referenced distance signal d is outputted to a robot control unit 8 via a corresponding interface. The referenced distance signal d is outputted to the robot control unit 8 as a seam track control signal for the robot arm 9 for regulating a position of the welding torch 11 during the welding process.

To clarify one possible exemplary embodiment of the method according to the invention by way of a simple example, let it be assumed, for the resistance R as the CTWD-dependent parameter P, that the referenced distance signal d has an output value range from 0 to 500 mΩ. So as to be able to represent distance deviations both upwards and downwards, by way of example the reference value of the resistance $P_{ref}$ is fixed as the middle of the output range, in other words at 250 mΩ. For a present operating point AP on the welding characteristic SKL stored in the memory unit 4 and selected for the welding process, the target resistance value $P_{soll}$ is calculated at for example 70 mΩ. The difference ΔP, calculated by the subtraction unit 5, between the reference value $P_{ref}$ and the target resistance value $P_{soll}$ is in this case 180 mΩ and, in one possible embodiment, is added by the modification unit 7 onto the actual resistance value $R_{ist}$ calculated from the present measurement values, which is for example 60 mΩ. This results in an output value of 240 mΩ for the referenced distance signal d. By means of the robot arm 9, the position of the welding torch 11 can be modified in such a way that the output value of the referenced distance signal d changes to the reference value $P_{ref}$ so as to maintain the desired CTWD distance.

LIST OF REFERENCE NUMERALS

1 Device for providing a referenced distance signal
2 Adjustment unit
3 Target value determination unit
4 Memory unit
5 Subtraction unit (SUB)
6 Actual value determination unit
7 Adaptation unit
8 Robot control unit
9 Robot arm
10 Welding wire electrode (SDE)
11 Welding torch
12 Welding power source
13 Power unit
14 Control valve
15 Supply line
16 Protective gas
17 Protective gas store
18 Wire feed device
19 Wire guide line
20 Supply drum
21 Welding line
22 Welding line
23 Cooling circuit
24 Line
25 Control line

The invention claimed is:

1. A method for providing a referenced distance signal, which corresponds to the distance between a contact tip of a welding torch and a workpiece to be machined, comprising the steps of:
   (a) adjusting an operating point on a predetermined welding characteristic which is defined at least by a wire feed rate, a welding voltage and/or a welding current, and a contact-tip-to-work distance (CTWD) between a contact tip of the welding torch and the workpiece to be machined;
   (b) reading out or determining a target parameter value of at least one parameter dependent on the CTWD for the operating point set on the welding characteristic;
   (c) determining an actual parameter value of the parameter dependent on the CTWD by measuring at least one of the present welding parameters of wire feed rate, welding voltage or welding current;
   (d) modifying the determined actual parameter value as a function of a calculated difference between the target parameter value and a predetermined reference value which is in the middle of an output value range of the referenced distance signal, wherein the determined actual parameter value is modified either - (a) by adding the difference between the target parameter value and a reference value onto the determined actual parameter value as an offset, or (b) by multiplying the actual parameter value by a correcting factor which is determined as a function of the difference between the target parameter value and the reference value; and
   (e) outputting the referenced distance signal, corresponding to the modified actual parameter value, as a seam track signal to a robot control unit during the welding process for regulating a position of the welding torch coupled to a robot arm, the position of the welding torch being modified by means of the robot arm in such a way that the output value of the referenced distance signal is changed to the predetermined reference value so as to maintain a desired CTWD.

2. The method according to claim 1, wherein the parameter dependent on the CTWD is the welding voltage, the welding current, the wire feed rate or a variable derived therefrom.

3. The method according to claim 2, wherein the parameter dependent on the CTWD is a welding resistance or an electrical welding power.

4. The method according to claim 1, wherein the welding voltage and the welding current are measured using sensors, which are provided on the welding torch or on a welding power source connected to the welding torch.

5. A device for providing a reference distance signal, which corresponds to the distance between a contact tip of a welding torch and a workpiece to be machined, comprising:
   an adjustment unit for adjusting an operating point on a predetermined welding characteristic which is defined at least by a wire feed rate, a welding voltage and/or a welding current, and for adjusting a contact-tip-to-work distance (CTWD) between the contact tip of the welding torch and the workpiece to be machined;
   a target value determination unit for determining a target parameter value of at least one parameter dependent on the CTWD for the operating point set on the welding characteristic;

an actual value determination unit for determining an actual parameter value of the parameter dependent on the CTWD by measuring at least the wire feed rate, the welding voltage and/or the welding current;

a modification unit for automatically modifying the determined actual parameter value as a function of a calculated difference between the determined target parameter value and a predetermined reference value which is in the middle of an output value range of the referenced distance signal; and an output interface for outputting the referenced distance signal, corresponding to the actual parameter value modified by the modification unit, the output interface configured for transmitting the referenced distance signal as a seam track signal to a robot control unit which controls a position of the welding torch coupled to a robot arm during the welding process as a function of the received seam track signal, the position of the welding torch being modified by means of the robot arm in such a way that the output value of the referenced distance signal is changed to the predetermined reference value so as to maintain a desired CTWD, wherein the modification unit modifies the determined actual parameter value either; (a) by adding the calculated difference between the target parameter value determined by the target value determination unit and the predetermined reference value onto the actual parameter value determined by the actual value determination unit, as an offset value, or (b) by multiplying the actual parameter value by a correcting factor which is determined as a function of the difference between the target parameter value determined by the target value determination unit and the predetermined reference value.

6. The device according to claim 5, wherein the actual value determination unit has sensors which detect in a sensory manner the actual parameter values of parameters which are dependent on the CTWD.

7. The device according to claim 6, wherein the sensors are provided on the welding torch and/or on a welding power source connected to the welding torch.

8. A welding device, comprising a robot control unit connected thereto, which controls a position of a welding torch during the welding process as a function of a reference distance signal, which reference distance signal is provided by a device according to claim 5, the welding torch being moved by the robot arm, the position of which relative to the workpiece to be machined is automatically regulated by the robot control unit as a function of the referenced distance signal.

* * * * *